(12) United States Patent
Chraim et al.

(10) Patent No.: US 11,368,380 B1
(45) Date of Patent: Jun. 21, 2022

(54) ESTIMATING END-TO-END NETWORK PACKET LOSS

(71) Applicant: Amazon Technologies, Inc., Seattle, WA (US)

(72) Inventors: Fabien Chraim, Tucson, AZ (US); John William Evans, Frome (GB)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 16/889,400

(22) Filed: Jun. 1, 2020

(51) Int. Cl.
*H04L 43/0829* (2022.01)
*H04L 41/14* (2022.01)
*H04L 41/12* (2022.01)

(52) U.S. Cl.
CPC .......... *H04L 43/0829* (2013.01); *H04L 41/12* (2013.01); *H04L 41/145* (2013.01)

(58) Field of Classification Search
CPC .... H04L 43/0829; H04L 41/12; H04L 41/145
See application file for complete search history.

(56) References Cited

U.S. PATENT DOCUMENTS

| | | | | |
|---|---|---|---|---|
| 2008/0159287 | A1* | 7/2008 | Nagarajan | H04L 69/22 370/392 |
| 2015/0281079 | A1* | 10/2015 | Fan | H04L 45/42 370/392 |
| 2016/0020993 | A1* | 1/2016 | Wu | H04L 43/028 370/392 |
| 2018/0219760 | A1* | 8/2018 | Li | H04L 43/10 |
| 2019/0373675 | A1* | 12/2019 | Chari | H04W 88/182 |
| 2020/0128426 | A1* | 4/2020 | Fox | H04L 47/2475 |

\* cited by examiner

*Primary Examiner* — Tonia L Dollinger
*Assistant Examiner* — Joseph M Cousins
(74) *Attorney, Agent, or Firm* — Klarquist Sparkman, LLP

(57) ABSTRACT

The numbers of packets transmitted and packets lost for network devices in a computer network are used to estimate a probability of end-to-end packet loss for traffic between a source-destination pair in the network. Metrics of packet transmission and loss at each network device interface are passively collected and transmitted to a network monitoring unit, which uses the metrics to calculate probability of successful packet transmission at each hop. For a particular end-to-end path between the source-destination pair, the network monitoring unit combines the probabilities of successful packet transmission for the hops along the path to yield a probability of successful end-to-end packet transmission. Probability of packet loss along the end-to-end path is determined based on the probability of successful end-to-end packet transmission. Alternatively, the network monitoring unit can estimate which available end-to-end paths between the source-destination pair have a probability of packet loss that satisfies a predetermined loss threshold.

17 Claims, 12 Drawing Sheets

ESTIMATING END-TO-END NETWORK PACKET LOSS

BACKGROUND

Large computer networks, often used in cloud computing or other applications, may contain hundreds or thousands of network devices of several types, such as switches, routers, and hubs. Data from a source endpoint (e.g., a host computer or a network device connecting to another network) travels to a destination endpoint via paths defined by links between multiple devices of the network. In packet-switched networks, the data is formatted into units, termed packets, that travel along the paths between endpoints. Loss of traveling packets is a key metric of service performance of the network. In particular, knowledge as to whether network packet loss is within the bounds of expectations provides an indication of the health of the network as well as whether an operator of the network is fulfilling service performance commitments to users or customers of the network. Knowledge of packet loss can also assist the network operator in identifying network performance issues that require repair.

In existing network systems, packet loss can be monitored by active monitoring or passive monitoring. In active monitoring, probe packets are sent end-to-end across the network. The number of probe packets successively delivered to a destination endpoint from a source endpoint are measured to provide a measure of packet loss along that source-destination path. However, such probe packets are sent at a relatively low rate compared to the real network traffic, and thus this approach under-samples the actual traffic and corresponding loss. As a result, active monitoring cannot provide an accurate method to measure end-to-end loss.

In contrast, passive monitoring relies on statistics of packet transmission and loss reported by each network device. In existing systems, the data from passive monitoring can be used to compile a traffic matrix, which represents the volume of traffic between all possible pairs of sources and destinations in the network. While passive monitoring provides an accurate measure of the loss rate at each network device, the information is limited to the corresponding network device. Thus, passive monitoring does not currently provide a measure of end-to-end path loss that would be experienced by traffic between a particular source-destination pair.

DETAILED DESCRIPTION

Data regarding the numbers of packets transmitted and packets lost for network devices in a computer network are used to provide a measure of a probability of end-to-end packet loss for traffic between a source-destination pair in the network. The numbers of packets transmitted and lost at each network device interface are passively collected for each network device and transmitted to a network monitoring unit. The network monitoring unit uses the data to determine a probability of successful packet transmission at each hop (e.g., an interface connecting network devices or an aggregation of interfaces connecting network devices). For a particular end-to-end path between a source-destination pair, the network monitoring unit combines the probabilities of successful packet transmission for the hops along the path to yield a probability of successful end-to-end packet transmission. The network monitoring unit can then calculate an estimate of packet loss along the end-to-end path based on the probability of successful end-to-end packet transmission. In some embodiments, the network monitoring unit can analyze multiple end-to-end paths between the source-destination pair and compare the estimated loss along each path to a predetermined threshold value for acceptable packet loss. The network monitoring unit may then return a percentage of available paths between the source-destination pair that comply with the predetermined threshold. The estimate of packet loss can be used by an operator of the network to take corrective action, such as notifying a particular customer of issues with data transmission to a particular destination, taking out of service network paths between particular source-destination pairs, or identifying particular network paths that require repair or further troubleshooting.

Figure 1:
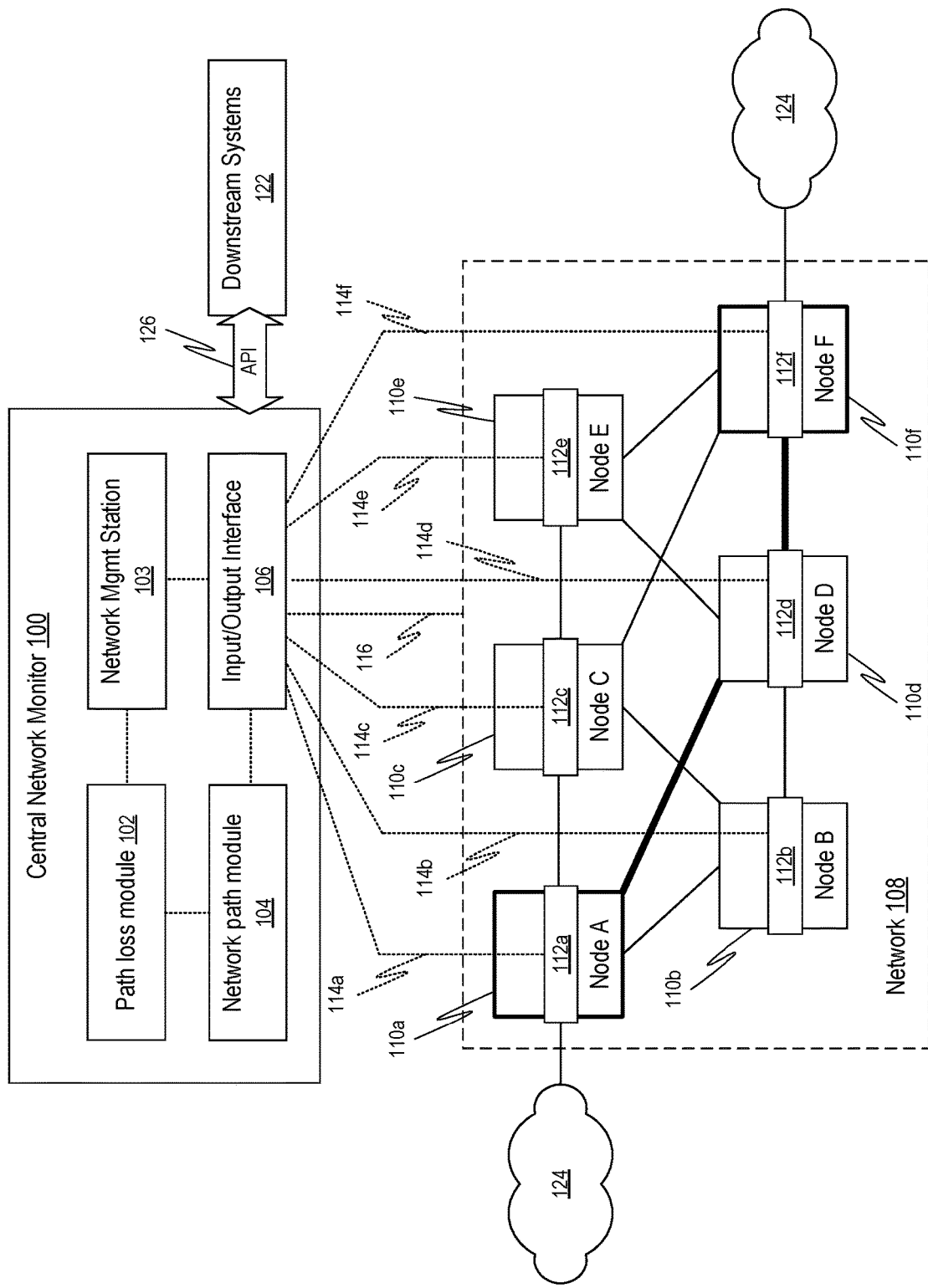
FIG. 1 is a simplified schematic diagram of a system for estimating end-to-end network packet loss, according to one or more embodiments of the disclosed subject matter.

FIG. 1 illustrates an exemplary system 100 for estimating end-to-end packet loss in a computer network 108. The computer network can be a geographically distributed collection of nodes 110 interconnected by communication links and segments for transporting data between end nodes or endpoints (e.g., node A 110a and node F 110f), such as personal computers and workstations, connections to an external network 124 (e.g., via border nodes), or other devices, such as sensors, etc. Each node 110 can be a network device, for example, a network router or switch. Alternatively, each node 110 can represent an interface of a network device or a container that aggregates interfaces of network devices. As used herein, interfaces refer to ports of the network device that provide connectivity to other devices of the network. As such, each network device may have multiple interfaces, for example, input ports and output ports. Although only six nodes 110a-110f are shown in FIG. 1 for simplicity of description, it will be appreciated that any number of nodes 110 can be provided in network 108. Indeed, in practical implementations, network 108 would include a large number of nodes 110, for example, on the order of hundreds or thousands.

Network 108 and/or external network 124 can be any type of network, such as a local area network (LAN) or a wide area network (WAN). LANs typically connect nodes over dedicated private communication links located in the same general physical location, such as a building or campus. WANs typically connect geographically dispersed nodes over long-distance communication links, such common carrier telephone lines, optical light paths, Synchronous Optical Networks (SONET), Synchronous Digital Hierarchy (SDH) links, or Power Line Communications (PLC), and so forth. Various network architectures, such as Clos networks, can be used. For example, network 108 may constitute a LAN while external network 124 constitutes a WAN or an intervening network that connects network 108 to the Internet.

Each node 110a-110f can include a respective agent 112a-112f that monitors packets transmitted and packets dropped by the node. For example, the agents 112a-112f can be respective software modules operating on the network devices 110a-110f. Alternatively, agents 112a-112f can be separate devices coupled to the respective node for monitoring performance thereof. The agents 112a-112f are configured to compile and periodically (e.g., every minute) transmit data regarding the amount of packets transmitted and the amount of packets lost (e.g., packets dropped or otherwise not transmitted due to an error) by the respective node 110a-110f to a network management station 103 of network monitoring system 100 via respective communication links 114a-114f and input/output interface 106. In some embodiments, the agents 112a-112f are configured to transmit the data to network management station 103 in response to a polling request from the network management station 103. For example, the agents 112a-112f and network management system 103 can operate in accordance with Simple Network Management Protocol (SNMP). In other embodiments, the agents 112a-112f are configured to transmit the data to network management station 103 automatically without the need for any polling by network management station 103. The automatic transmission of data from the agents 112a-112f may be continuous or according to a predetermined schedule. For example, communication between agents 112a-112f and network management system 103 can be by streaming telemetry.

In addition to the network management station 103 and input/output interface 106, the network monitoring system 100 can include a network path module 104. The network path module 104 is configured to determine one or more end-to-end paths between a source-destination pair of network devices in the network. In some embodiments, the network path module 104 receives information regarding the physical topology of the network and routing or forwarding logic of the network devices to determine end-to-end paths for data packet transmission. Alternatively or additionally, the network path module 104 can determine end-to-end paths via simulation or algorithm, for example, by simulating routing behavior of the network based on routing or forwarding logic. The network path module 104 can receive the topology and/or logic information from network 108, for example, via a separate communication link 116 with a network-wide administration device (not shown) and/or from each node 110a-110f via the respective data communication links 114a-114f. Alternatively or additionally, the network path module 104 is configured to perform active probing of network 108 to determine packet travel paths from each source to each destination. For example, the network path module 104 can employ a route-tracing function (e.g., traceroutes or tracert) for a particular source-destination pair.

The network monitoring system 100 can further include a path loss module 102. The path loss module 102 receives data indicative of the quantity of packets transmitted and the quantity of packets lost at each node 110 from network management station 103. Using the data and the determined end-to-end path from the network path module 104, path loss module 102 can provide a measure of a probability of the end-to-end packet loss for traffic between the source-destination pair of network 108. In some embodiments, the path loss module 102 calculates a transmission success rate for each node 110 along the determined end-to-end path between the source and destination, where the transmission success rate is the probability that a packet will be successfully transmitted by the node in a measurement interval. For example, the transmission success rate can be given as the ratio of the number of packets successfully transmitted by the node in a measurement interval (or a corresponding packet transmission rate) to the total number of packets handled by the node in the measurement interval (or a packet handling rate). The total number of packets handled by the node can be given by the sum of the number of packets successfully transmitted and the number of packets lost by the node during the measurement interval. The path loss module 102 then compiles the individual transmission success rates from each node along the end-to-end path to estimate the probability of successful transmission on the end-to-end path. For example, the probability of successful transmission on the end-to-end path can be determined as the product of the individual transmission success rates from each node along the end-to-end path. The path loss module 102 can then estimate the probability of packet loss on the end-to-end path, for example, by taking the complement of the probability of successful transmission (e.g., (probability of packet loss)$_{PATH}$=1−(probability of successful transmission)$_{PATH}$). In some embodiments, the path loss module 102 can periodically (e.g., every minute) re-estimate the probability of packet loss, for example, based on updated data from network management station 103 and/or updated end-to-end paths from network path module 104, so as to provide a substantially real-time or near real-time analysis of network loss conditions.

In some embodiments, one or more of the nodes 110 include multiple network device interfaces. For example, multiple interfaces can be spatially aggregated together into respective hierarchical containers that act as nodes, in order to reduce the computational load required and/or to simplify end-to-end path determinations. The path loss module 102 can combine packet transmission and loss data for each interface within the container to determine a transmission success rate that applies to the entire container. For example, for each container along the end-to-end path, the path loss module 102 can add together the numbers of packets transmitted by all of the interfaces of the container, thereby yielding a total number of packets transmitted by the container. The path loss module 102 can further add together the numbers of packets lost (e.g., dropped or not transmitted due to an error) by all of the interfaces of the container, thereby yielding a total number of packets lost by the container. The path loss module 102 can further calculate the transmission success rate for the container as the ratio of the total number of packets transmitted to the total number of packets handled (i.e., the sum of the total number of packets transmitted and the total number of packets lost by the container). In another example, for each container along the end-to-end path, the path loss module 102 can determine the transmission success rate of the container as an average of the transmission success rates of its constituent interfaces. In either approach, the path loss module 102 may otherwise proceed to estimate the probability of packet loss on the end-to-end path similar to that described above, for example, by calculating the probability of successful end-to-end transmission as the product of the container-level transmission success rates and then calculating the probability of end-to-end packet loss as the complement of the probability of successful end-to-end transmission.

In some embodiments, the path loss module 102 may provide a measure of end-to-end packet loss for multiple paths between a particular source-destination pair. Indeed, there may be multiple end-to-end paths through the network 108 that are possible for each source-destination pair. The network path module 104 can determine each of these potential end-to-end paths through the network 108 rather than just a single path. Each of the determined end-to-end paths may employ a different combination of interfaces, e.g., selecting a different interface in each container of interfaces. For each of these end-to-end paths, the path loss module 102 can calculate the probability of successful end-to-end transmission and then calculate the probability of end-to-end packet loss as otherwise described above. The path loss module 102 may calculate a percentage of the potential end-to-end paths between the source-destination pair that comply with a predetermined acceptable loss threshold (e.g., having a probability of packet loss that is less than or equal to 0.1%). The path loss module 102 may return the percentage as the measure of the probability of end-to-end packet loss (e.g., 90% of available end-to-end paths between the source-destination pair comply with the acceptable loss threshold). Alternatively or additionally, the path loss module 102 may return an indication of those end-to-end paths that fail to comply with the acceptable loss threshold.

Communications from interface 106 to one or more downstream systems or services 122 can be in the form of network service requests 126. Network services are commonly used in cloud computing. A network service is a software function provided at a network address over the web or the cloud. Clients initiate network service requests to servers and servers process the requests and return appropriate responses. The client network service requests are typically initiated using, for example, an API request. For purposes of simplicity, network service requests will be generally described herein as API requests, but it is understood that other network service requests can be made. An API request is a programmatic interface to a defined request-response message system, typically expressed in JSON or XML, which is exposed via the web—most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a network service receives the API request from a client device or from the host computer, the network service can generate a response to the request and send the response to the endpoint identified in the request.

For example, downstream system 122 can be a user interface that receives the measures of the probability of end-to-end packet loss for source-destination pairs from network monitoring system 100. The user interface can allow an operator or provider of network 108 to take corrective action or to confirm that the network 108 meets performance level standards established by a service agreement with a customer of the network 108. For example, the measure can alert an operator to source-destination pairs that may experience elevated loss. The operator can thus alert a customer, who is the source of or the destination for the impacted traffic flow, about the degraded performance. Alternatively or additionally, the operator can put a portion of the network 108 impacted by the estimated end-to-end loss out of service, for example, to force customer traffic to pass through another part of the network or to allow for repair or troubleshooting. In another example, downstream system 122 can be an alarm module that receives the measures of the probability of end-to-end packet loss for source-destination pairs from network monitoring system 100. Based on the data from the network monitoring system, the alarm module can automatically detect which end-to-end paths are non-compliant (e.g., have probabilities of end-to-end packet loss that exceeds a predetermined threshold value) and/or if traffic along an end-to-end path is anomalous (e.g., probability of end-to-end packet loss has increased significantly compared to a normal level, even if it may not exceed the predetermined threshold value). The alarm module may take corrective action based on the automatic detection and/or provide a notification to an operator of the network or to a customer affected by the degraded end-to-end performance. Other downstream systems or services that can interact with network monitoring system 100 via API 126 are also possible according to one or more contemplated embodiments.

In the simplified example illustrated in FIG. 1, network path module 104 determines that traffic from source node A 110a to destination node F 110f travels via intermediate node D 110d along the highlighted communication links. Agents 112a-112f report to network management station 103 data regarding number of packets transmitted and number of packets lost in a particular time period by their respective nodes 110a-110f. Using this data, the path loss module 102 calculates the transmission success rate, S(A), for source node A 110a, the transmission success rate, S(D), for intermediate node D 110d, and the transmission success rate, S(F), for destination node 110f. For example, the transmission success rate, S(X), for each node X, is given by S(X)=(packets transmitted by node X)/(packets transmitted by node X+packets lost by node X). The path loss module 102 then estimates the probability of successful transmission on the end-to-end path based on the individual transmission success rates, e.g., S(A→F)=f(S(A), S(D), S(F)). For example, the path loss module 102 estimates the probability of successful transmission as the product of the individual transmission success rates, S(A→F)=S(A)×S(D)×S(F). The probability of packet loss, L, along the highlighted end-to-end path from source node A 110a to destination node F 110f can then be estimated by taking the complement of the probability of successful transmission, i.e., L(A→F)=1−S(A→F).

A similar analysis would be repeated by path loss module 102 for each source node (e.g., node B as source node, node C as source node, etc.) and each destination node (e.g., node A as destination node, node B as destination node, etc.) in network 108 to fully characterize traffic demand and loss between each source-destination pair. Such analyses by the path loss module 102 may occur in parallel or sequentially. It should be appreciated that the analysis above is greatly simplified, and that practical implementations involving hundreds or thousands of nodes and/or endpoints would be substantially more complex and require significant computing power. Indeed, in some embodiments, measures may be taken to reduce the amount of computing power required and/or simplify the calculations. For example, network device interfaces that do not carry a significant amount of traffic (e.g., transmitting less than 1,000 packets per second) may be eliminated from the analysis performed by network monitoring system 100. Alternatively or additionally, interfaces can be spatially aggregated into containers, as mentioned above and described in further detail below.

Figure 2:
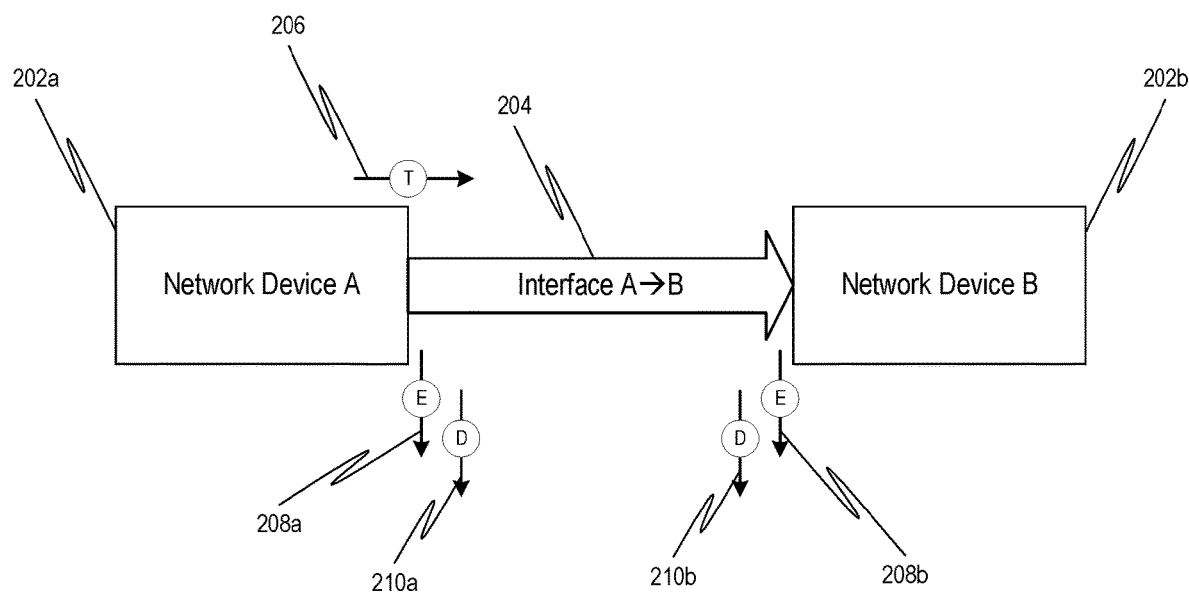
FIG. 2 shows details of packet transmission and loss via an interface connecting network devices in the network.

FIG. 2 illustrates further details regarding determination of packet transmission and loss for the network device interfaces employed in a network, such as network 108 in FIG. 1. Physical interface 204 is an entity connecting two network devices 202a, 202b. For example, the success rate and loss rate for the physical interface 204 can be given by:

$$InterfaceLoss_{A \to B} = \frac{PacketsLost_{A \to B}}{TotalPackets_{A \to B}}, \text{ and}$$

$$InterfaceSuccess_{A \to B} = 1 - InterfaceLoss_{A \to B}.$$

In some embodiments, the number of packets lost and the total packets can be based on output metrics of network device A 202a, e.g., the number of packets transmitted 206, the number of packets dropped 210a, and the number of packets not sent due to an error 208a. The loss rate for the physical interface 204 may then be given by:

$$InterfaceLoss_{A \to B} = \frac{OutputDiscards_A + OutputErrors_A}{OutputDiscards_A + OutputErrors_A + OutputTransmitted_A}.$$

In other embodiments, the number of packets lost and the total packets can instead be based on the output metrics of network device A 202a in combination with input metrics of network device B 202b, e.g., the number of packets dropped 210b and the number of packets not received due to an error 208b. The loss rate for the physical interface 204 may then be given by:

$$InterfaceLoss_{A \to B} = \frac{\begin{array}{c}OutputDiscards_A + OutputErrors_A + \\ InputDiscards_B + InputErrors_B\end{array}}{\begin{array}{c}OutputDiscards_A + OutputErrors_A + OutputTransmitted_A + \\ InputDiscards_B + InputErrors_B\end{array}}.$$

Figure 3:
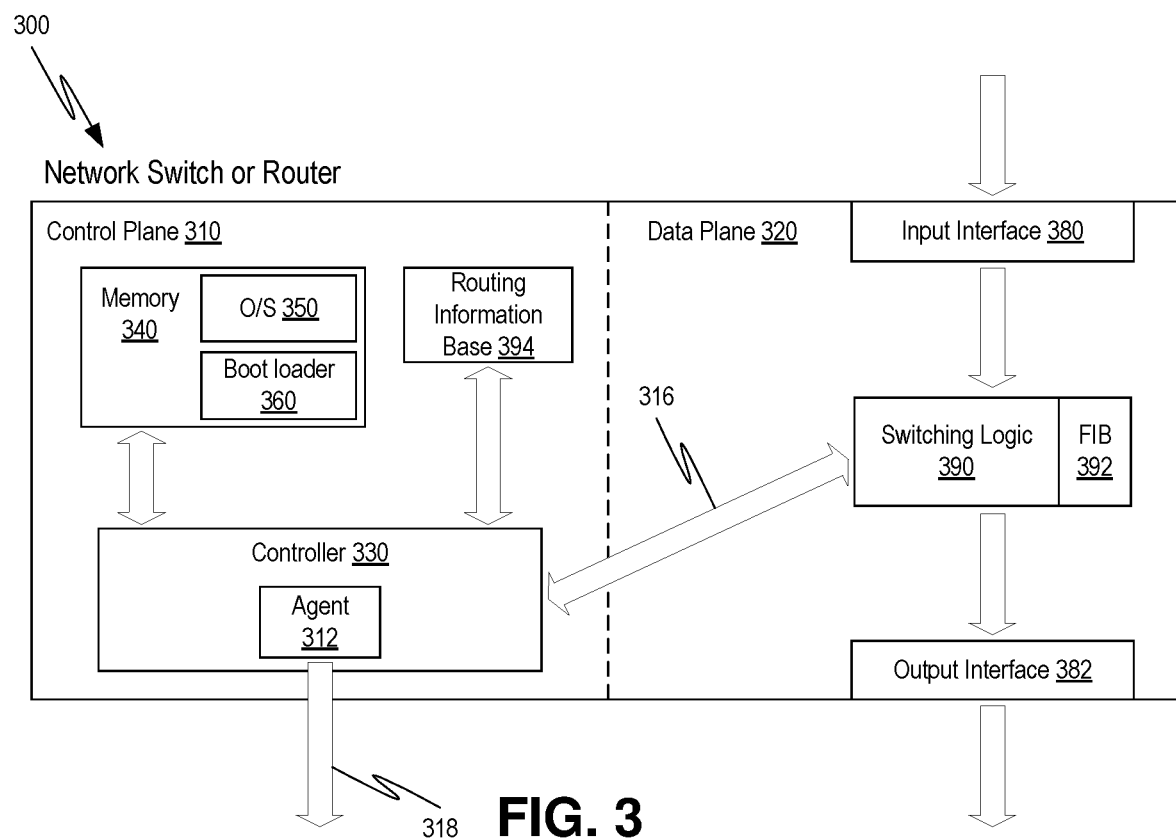
FIG. 3 shows implementation details of an exemplary switch or router employed in the network.

FIG. 3 illustrates further details of a network switch or router 300, which may act as a node 110 in network 108. The router 300 includes a control plane 310 and a data plane 320. The control plane 310 is generally a management layer for configuring, updating, and controlling the data plane 320. The control plane 310 includes a controller 330, which can be a Central Processing Unit (CPU), processor, application-specific integrated circuit (ASIC), microcontroller, or any hardware logic that can receive packets and provide switch management and control in response thereto. The controller 330 has access to a memory 340 that can be a Dynamic Random Access Memory (DRAM), Flash memory, or other type of RAM or ROM. The memory 340 is used to store an operating system 350 and a boot loader program 360, which is a first program executed after a reboot of the controller 330. Although a single memory is shown, the memory 340 can be divided into multiple memories and even memories of different types.

A communications bus 316 allows communications between the controller 330 and the data plane 320. The communication bus 316 can be any desired bus type, such as peripheral component interconnect (PCI), PCI express (PCIe), accelerated graphics port (AGP), etc. The data plane 320 includes input interfaces or ports 380 and output interfaces or ports 382 used for receiving and sending network packets, respectively. Interfaces 380, 382 provide network connectivity to/from the router. For example, console and auxiliary ports can be used for managing the router. The routers also have ports for LAN and WAN connectivity. The LAN interfaces usually include Ethernet, Fast Ethernet, Fiber Distributed Data Interface (FDDI), or Token Ring. An attachment unit interface (AUI) port is used to provide LAN connectivity. Alternatively or additionally, the router can be provided with interfaces for asynchronous transfer mode (ATM) as well. The router can also include sync and async serial interfaces, which can be used for WAN connectivity. Alternatively or additionally, the router can include integrated services digital network (ISDN) interfaces, which provide ISDN connectivity and can be used to transmit both voice and data.

Switching logic 390 is positioned between the input and output ports. The switching logic 390 includes hardware for switching and can include a routing table, for example, a forwarding information base (FIB 392). The FIB 392 can be programmed by the controller 330 to ensure packets are switched to the proper output port 382. The control plane 310 further includes a routing information base (RIB) 394, which stores prefix information for network devices on the network. The controller 330 can execute regular updates to program the FIB 392 using data within the RIB 394.

Controller 330 may further include an agent 312, which can be a software module that monitor packets transmitted and packets dropped by the network switch or router 300, for example, similar to agent 112 of FIG. 1. In some embodiments, the agent 312 can operate in accordance with SNMP to collect and organize information about the performance of the router 300 in processing packets. For example, the agent 312 can receive information regarding number of packets transmitted and lost via communication bus 316 and can accumulate the information in memory 340. In response to a polling request, for example, from network management station 103 in FIG. 1, the agent 312 can retrieve the accumulated information from memory 340 and send an appropriately formatted message indicating number of packets transmitted and lost in a requested time period. The agent 312 may send the formatted message to the network management station 103 via separate communication link 318 or via the network through output interface 382. In some embodiments, the agent 312 can instead operate in accordance with network or streaming telemetry protocol. In such embodiments, the agent 312 automatically sends information regarding packet transmission and loss rate to the network management station 103 according to a predetermined schedule (e.g., every minute) or continuously.

Figure 4:
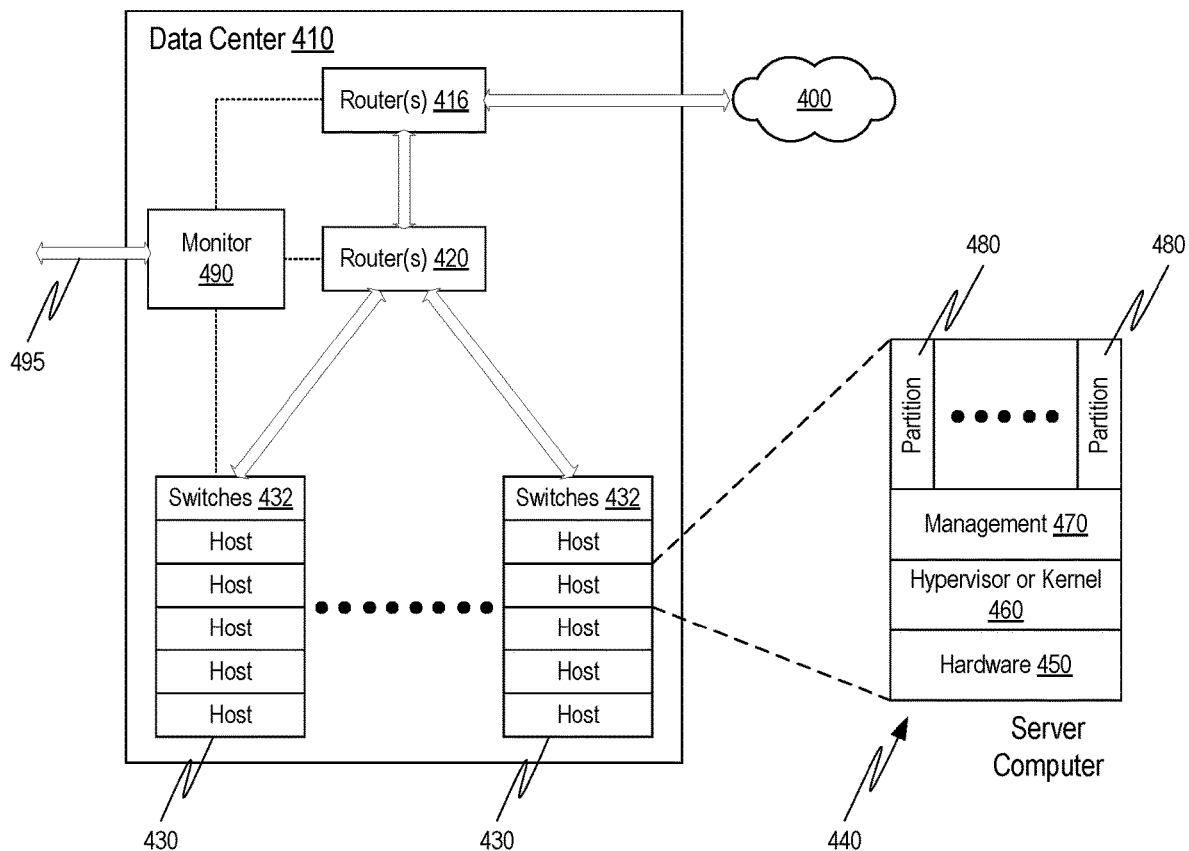
FIG. 4 illustrates an exemplary data center within a compute service provider that transmits packets through a network.

FIG. 4 illustrates further details of a network data center 410. The data center 410 is coupled together by one or more routers 416, which read address information in a received packet and determine the packet's destination. If the router 416 decides that the packet is bound for a border network, then the packet is forwarded to that border network as indicated at 400. If the packet is addressed to a host in the data center 410, then it is passed to one or more additional routers 420, which route the packets to one or more racks of host server computers 430. Each rack can include a switch 432 coupled to multiple host server computers.

A particular host server computer is shown in an expanded view at 440. Each host 440 has underlying hardware 450 including one or more CPUs, memory, storage devices, etc. Running a layer above the hardware 450 is a hypervisor or kernel layer 460, which may be classified as a type 1 or type 2 hypervisor. A type 1 hypervisor runs directly on the host hardware 450 to control the hardware and to manage guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 470 can be part of the hypervisor or separated therefrom and generally includes device drivers needed for accessing the hardware 450. The partitions 480 are logical units of isolation by the hypervisor. Each partition 480 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. Any applications executing on the instances can be monitored using the management layer 470.

The data center 410 can further include a network monitor 490. In some embodiments, network monitor 490 can operate similar to central network monitor 100 of FIG. 1. Thus, network monitor 490 can receive information regarding packet transmission and loss at each node (e.g., switches 432, routers 418, routers 420, etc.) and can use that information to estimate the end-to-end packet loss for respective source-destination pairs. Alternatively, in some embodiments, data center 410 is part of a larger network and central network monitor 100 of FIG. 1 operates with respect to that larger network. In such embodiments, network monitor 490 may instead operate similarly to network management station 103 in FIG. 1. For example, network monitor 490 can accumulate information regarding packet transmission and loss at switches 432, routers 418, and routers 420 and can send that information to the central network monitor, for example, via communication link 495.

As noted above, practical network implementations may involve hundreds or thousands of nodes and/or endpoints, which may require substantial computing power to estimate end-to-end traffic flows and losses. Thus, in some embodiments, similarly situated interfaces can be grouped together and treated as a single entity for purposes of estimating packet losses in order to reduce computational resources required.

In some embodiments, a topological network map or hierarchical aggregation graph can be assembled for each node of the network and corresponding interfaces between nodes. The graph is generally a topological rank of network devices and/or interfaces based on an attribute such as aggregation level; that is, the network monitoring system may assemble the aggregation graph and rank containers in the graph as having greater or lesser degrees of aggregation. For example, a device may be ranked based on the number of other network devices it is in relation to "within", "beneath" or "above" other network devices. Thus, in some instances, devices with lower levels of hierarchical aggregation may be referred to as "downstream" relative to devices with higher levels of hierarchical aggregation, which may be referred to as "upstream" based on the aggregation of hierarchical communication channels.

The network topology may be abstracted to any one or more aggregated network topologies based on the various classifications of network devices and/or interfaces in the hierarchical aggregation. In some embodiments, hierarchical aggregation of the network devices into containers may include computing a hierarchical graph that includes all the valid aggregations (permutations) of the network devices, interfaces, and/or containers from an edge or a host to a highest topological layer. In an example, the highest topological layer may correspond to the largest aggregation area, for example, a building containing all the network devices. The network devices may be grouped into a respective container based on similarity among the network devices. Alternatively or additionally, the network devices are grouped together based on one or more attributes including, but not limited to, a device type, a device function, and a geographic location. The type of device may include manufacturer details, functionality, and hardware and/or software (e.g., software version) configuration of the device. Alternatively or additionally, the network devices may also be arranged into different hierarchical layers based on the one or more attributes. For example, a layer in the hierarchical graph may include one or more firewalls, while a lower layer may include all the routers connected with the one or more firewalls.

Based on the aggregated network topology for the network devices, a corresponding aggregated topology can be generated based on interfaces of the network devices. For example, interfaces of network devices can be hierarchically aggregated together into "containers" based on a desired level of aggregation and spatial arrangement of the network devices (e.g., the existing organization of the network devices in different layers of the network into respective containers). In some embodiments, the aggregation of interfaces into containers is based on neighbor information from each interface. For example, if a first network device is assigned to a first container (e.g., container A in a first layer) and has an interface that connects to a second network device assigned to a second container (e.g., container B in a second layer), then the interface for the first network device would be assigned to a container representative of that connection (e.g., container A→B). If, however, the first network device and the second network device both belong the same container (e.g., container A in the first layer), then that container is associated with the interface.

Figure 5A:
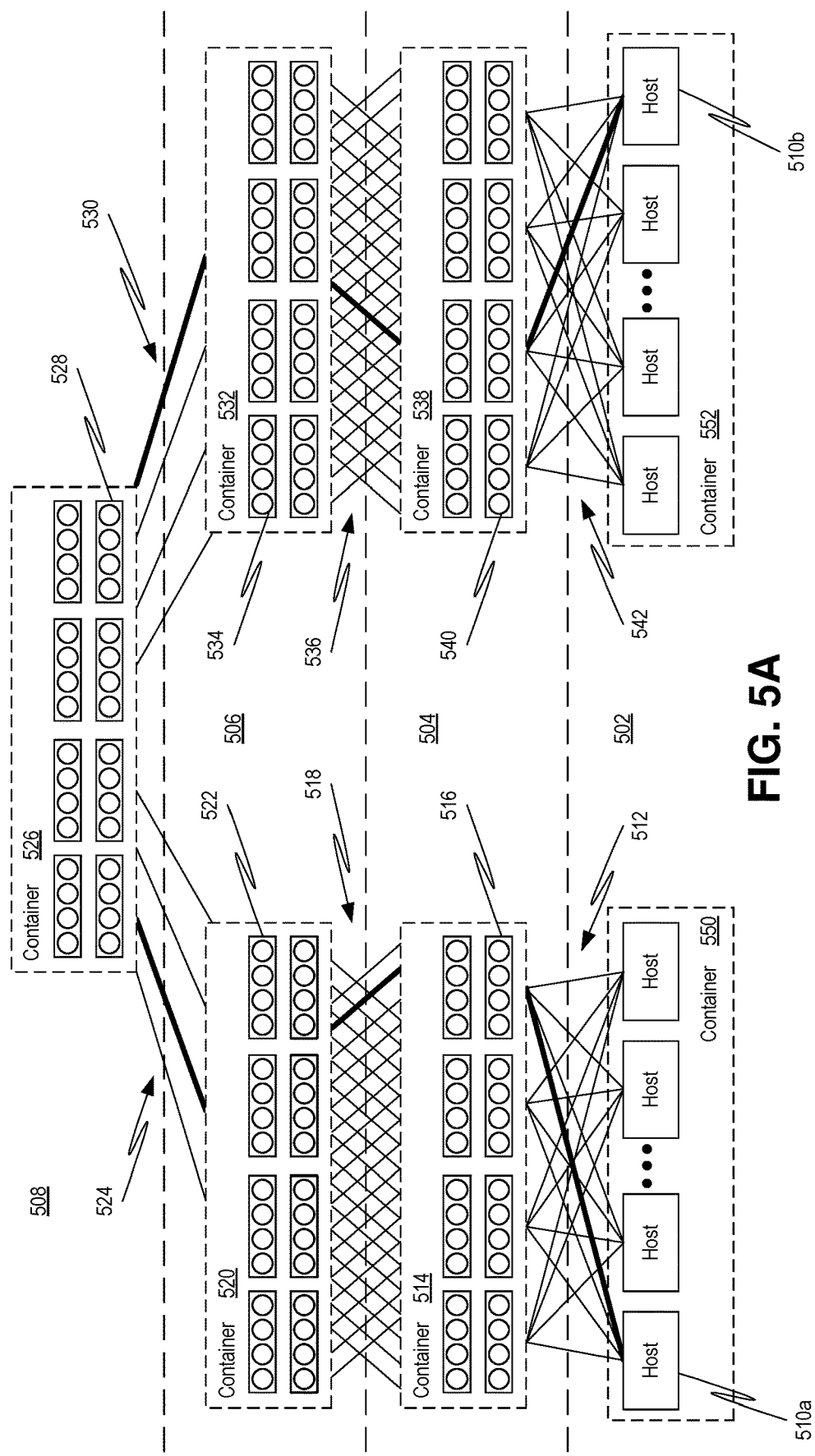
FIG. 5A-5C illustrate examples of different levels of hierarchical aggregation for use in estimating end-to-end network packet loss.

Different aggregation levels may result in different assignments of interfaces to containers. For example, an interface may cross containers at a first aggregation level and otherwise be contained within a single container at higher aggregation levels. FIG. 5A shows an exemplary hierarchical aggregation of interfaces into containers at a first level of aggregation. The hierarchical aggregation of interfaces can be based on the physical topology of the network (e.g., the network layer 502-508 where the network device resides) as well as its connection between network layers (e.g., link connects to a same container in an adjacent level).

In the illustrated embodiment of FIG. 5A, all of the links 518 from interfaces 516 in container 514 connect to respective interfaces 522 in container 520, and all of the links 524 from interfaces 522 in container 520 connect to respective interfaces 528 in container 526. Similarly, all of the links 536 from interfaces 540 in container 538 connect to respective interfaces 534 in container 532, and all of the links 530 from interfaces 534 in container 532 connect to respective interfaces 528 in container 526. The hosts in layer 502 may also be aggregated into respective source or destination containers. For example, hosts 510a (e.g., a source or destination endpoint) can be aggregated together as container 550, which is connected to interfaces 516 in container 504 via respective links 512, while hosts 510b (e.g., a source or destination endpoint) can be aggregated together as container 552, which is connected to interfaces 540 in container 538 via respective links 542.

Measuring the availability of a container (e.g., any of containers 514, 520, 526, 532, 538, 550, 552) may rely on the packet transmission and loss experienced at each physical interface. Since data from agents of the network devices may contain both physical and virtual interfaces (e.g., port channels and other aggregations), the data from the interfaces can be filtered based on their properties. Data regarding total packets transmitted and lost by each interface in the container in a particular time period (e.g., each minute) can be sent by the respective agent to a central monitor, e.g., network monitoring system 100 of FIG. 1.

As illustrated in FIG. 5A, the number of paths between any two endpoints may be large due to path redundancy for resilient design. To determine a path that traffic may take between a particular source-destination pair, a route-tracing function of an active monitoring module of the network can be used. For example, for traffic from source host 510a to destination host 510b in FIG. 5A, the bolded path may be taken by packets traversing the network. By performing a route-trace (e.g., traceroute) for this source-destination pair and extracting the containers seen along this route, a "container path" can be obtained. The sequence of containers and corresponding container links is representative of the customer traffic between the two network endpoints. This assumes that if route-tracing function traverses a particular set of container links between two network endpoints, then all of the interfaces in those containers are reachable by the customer traffic between those endpoints. By understanding the current state of the network and its routing logic, the assumption can be validated or invalidated. The aggregation into containers thus involves capturing the route-tracing functions for a particular type of end-to-end network traffic and then aggregating network devices or interfaces thereof along the captured paths into respective containers as well as container links. The captured paths may be aggregated spatially. In some embodiments, additional endpoints adjacent to containers on the paths can be included if the containers have additional interfaces that do not otherwise present in the route-tracing functions.

As an alternative to route-tracing in order to aggregate interfaces into containers, or in addition thereto, container paths can be obtained by building a hierarchical graph (similar to FIG. 5A) from the network topology and traversing the graph from leaf to leaf based on knowledge of the routing rules within the network. As an alternative to using routing rules of the network, the container paths can be approximated by computing shortest paths on the hierarchical graph, although this may oversimplify traffic patterns and/or remove important edge cases. For each pairing of source-destination endpoints (e.g., source host 510a and destination host 510b), a number of unique paths aggregated to the various levels of the hierarchy can be obtained.

Once the container paths are obtained, transmission success rate and/or packet loss rate at each container hop can be determined and used in the estimation of end-to-end packet loss. In some embodiments, the container-level packet loss rate (the complement of which defines the container-level transmission success rate) can be determined by treating the container as a single interface. For example, the loss rate of the container can be obtained by counting all packets lost on all interfaces of the container and normalizing by the sum of all packets handled by all of the interfaces of the container. For a container with N interfaces, the container-level loss rate can be given by:

$$ContainerLoss = \frac{\sum_{i=1}^{N} discards_i + errors_i}{\sum_{i=1}^{N} discards_i + errors_i + packetsOut_i}.$$

In other embodiments, the container-level packet loss rate can be determined by averaging interface losses across the container. For example, for a container with N interfaces, the container-level loss rate can be given by:

$$ContainerLoss = \frac{\sum_{i=1}^{N} InterfaceLoss_i}{N}.$$

The container-level loss rate for each container along the end-to-end path can be combined by taking the complement of the probability of success of transmission of a packet from end to end. For example, for a path with M container hops, the estimated probability of end-to-end packet loss can be given by:

$$PathLoss = 1 - \prod_{i=1}^{M} (1 - ContainerLoss_i).$$

Alternatively or additionally, the container-level loss rate for each container can be combined to provide the probability of end-to-end packet loss, for example, by taking the product of the individual container-level loss rates. Alternatively, the transmission success rate of each container can be obtained in a similar manner, for example, by counting all packets transmitted by all interfaces of the container and normalizing by the sum of all packets handled by the all of the interfaces of the container. An end-to-end transmission success rate can then be determined as the product of individual container-level transmission success rates, and the probability of end-to-end packet loss can be determined as the complement to the end-to-end transmission success rate (i.e., probability of end-to-end packet loss=1−transmission success rate). In some embodiments, the probability of end-to-end packet loss can be returned, for example, as an output of the network monitoring system 100. In other embodiments, the probability of end-to-end packet loss can be compared with a predetermined threshold (e.g., an acceptable packet loss rate of 0.1%) to derive a measure of path compliance.

Figure 5B:
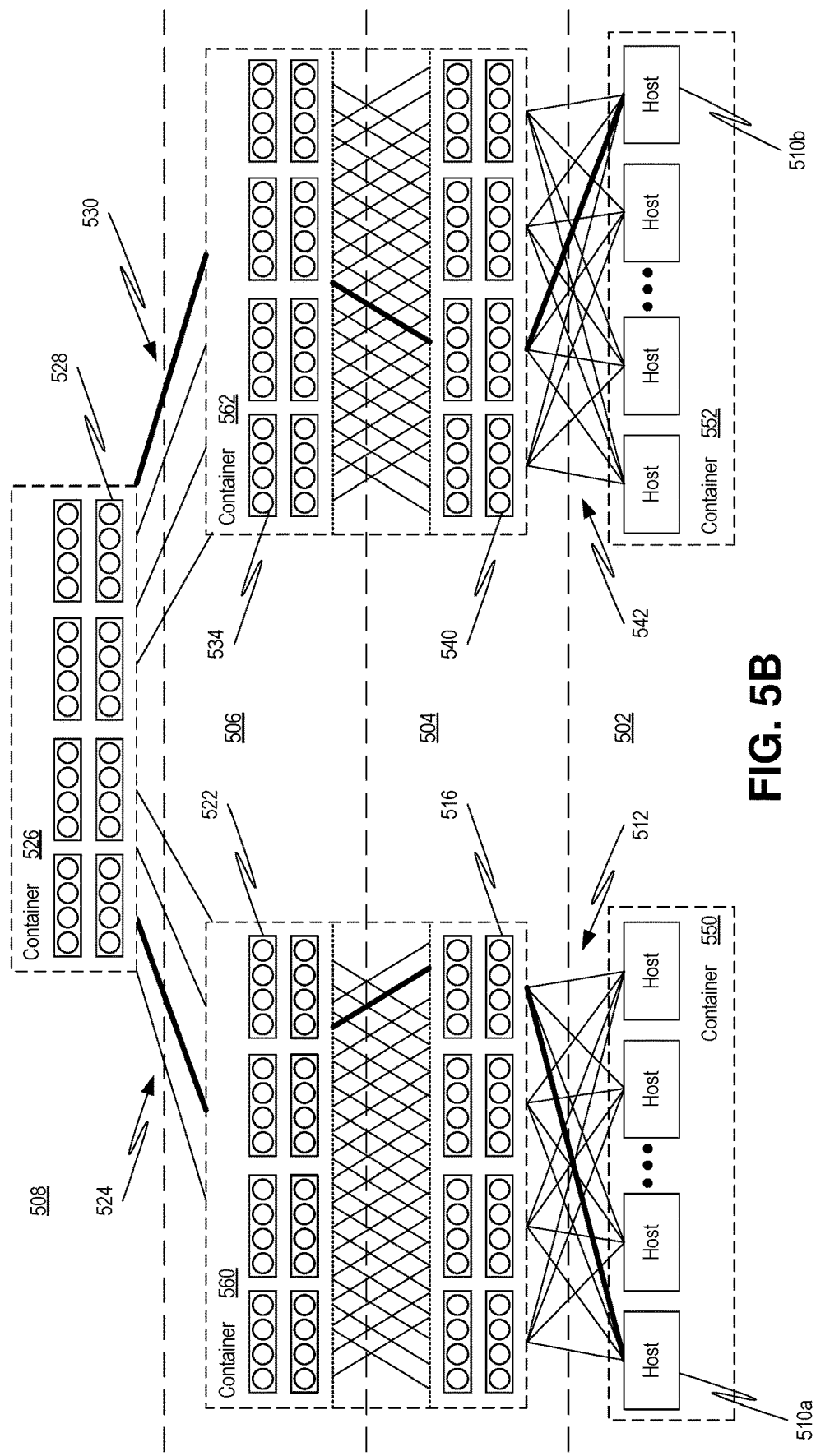

Although five containers are illustrated in FIG. 5A, embodiments of the disclosed subject matter are not limited thereto. Rather, fewer or additional hierarchical levels and/or fewer or additional containers are also possible depending on a desired level of aggregation as well as the number of network layers, the number of network devices, and available interface connections. For example, FIG. 5B shows an exemplary hierarchical aggregation of interfaces into containers at a second level of aggregation higher than the first. Thus, in FIG. 5B, interfaces 516 and 522 are now grouped into a new container 560 that spans network layers 504, 506.

Container 560 is connected to host container 550 via connections 512 and to container 526 via connections 524. Similarly, interfaces 534 and 540 are now grouped into a new container 562 that spans network layers 504, 506. Container 562 is connected to host container 552 via connections 542 and to container 526 via connections 530. As compared to FIG. 5A, the processing for the end-to-end path between host container 550 and host container 552 in FIG. 5B may be simplified since it involves traversing only three intermediate containers rather than the five intermediate containers of FIG. 5A.

Figure 5C:
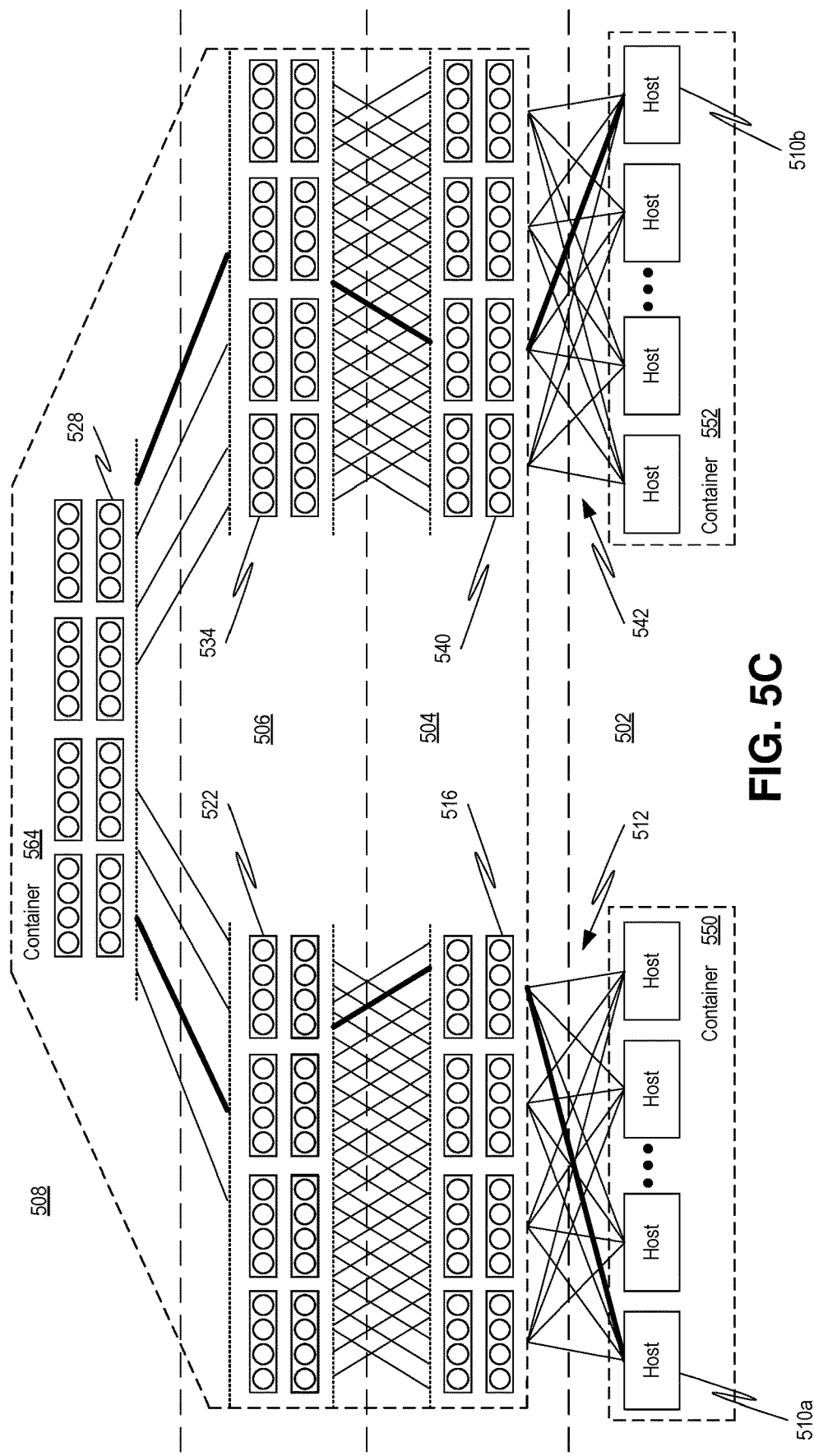

FIG. 5C shows another exemplary hierarchical aggregation of interfaces into containers at a third level of aggregation higher than the second. Thus, in FIG. 5C, all interfaces 516, 522, 528, 534, and 540 in network layers 504-508 are grouped into a common container 564. Container 564 is connected to host container 550 via connections 512 and to host container 552 via connections 542. As compared to FIG. 5B, the processing for the end-to-end path between host container 550 and host container 552 in FIG. 5C may be further simplified since it involves traversing only one intermediate container rather than the three intermediate containers of FIG. 5B.

While higher levels of aggregation may help to simplify processing, such higher levels may produce less meaningful results in estimating the probability of end-to-end packet loss due to the grouping of larger numbers of interfaces together. Indeed, various levels of spatial or hierarchical aggregation may be useful in different application. Each aggregation level can transform a granular topology (e.g., of devices and interfaces) into a corresponding topology of containers and links among them. Accordingly, aggregation may be selected to achieve a balance in processing requirements and coverage of interfaces, depending on the application.

Figure 6:
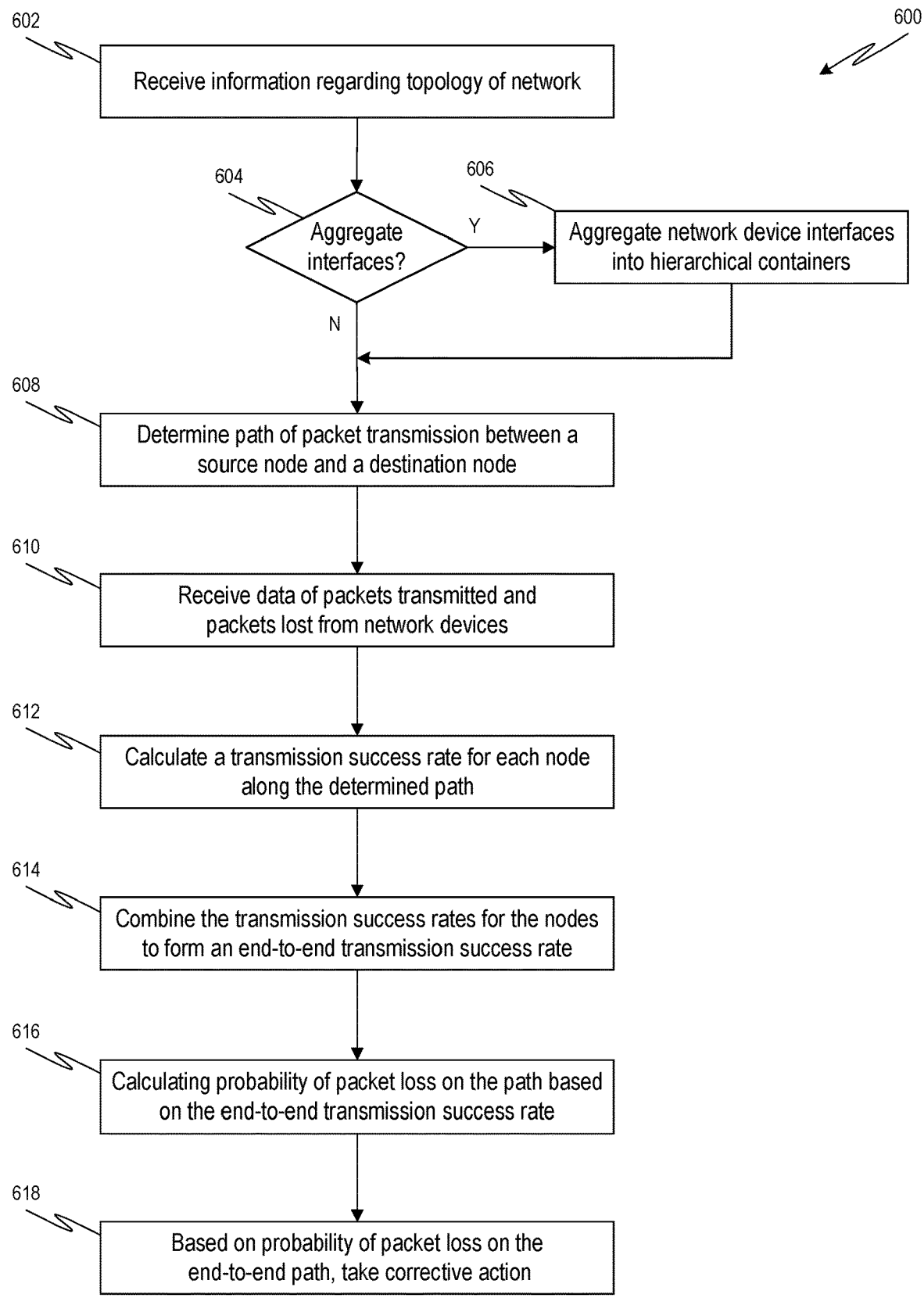
FIG. 6 is a process flow diagram of an exemplary method for estimating end-to-end network packet loss.

FIG. 6 depicts an exemplary method 600 for estimating the probability of packet loss for an end-to-end path through a network. The method 600 can initiate at 602, where information regarding topology of the network can be received, for example, by the network monitoring system of FIG. 1. The information can include details of the network topology (e.g., the location of network devices and physical connections between network devices) and routing logic (e.g., routing or forwarding rules of the network, such as a routing table or forwarding table of each network device). The method 600 can proceed to 604, where it is determined if aggregation of network device interfaces is desired. If aggregation is desired at 604, for example, to reduce the amount of processing required, the method 600 proceeds to 606, where network device interfaces are hierarchically aggregated into respective containers based on neighbor information for each interface. For example, the aggregation of interfaces may be as described above with respect to FIGS. 5A-5C.

Once aggregation 606 is complete, or if aggregation is not desired at 604, the method 600 can proceed to 608, where an end-to-end path for transmission of packets through the network from a source node to a destination node is determined. For example, the end-to-end path can be determined by a network path module, such as network path module 104 of FIG. 1. In some embodiments, the end-to-end path can be derived using the topology information of the network and the routing logic of the network devices. Alternatively or additionally, the end-to-end path can be determined by simulating routing behavior of the network. In other embodiments, the end-to-end path can be determined by an active monitoring function, for example, a route-tracing function (e.g., traceroute or tracert) that sends a test packet from a particular source to a particular destination to identify a path through the network that traffic can take for that source-destination pair.

The method 600 can proceed to 610, where data regarding packet transmission and loss at each network device (or containers, when interfaces are aggregated into containers) is received. The packet transmission and loss data can be collected by an agent, for example, agent 112 of FIG. 1 or agent 312 of FIG. 3. The collected data may be periodically (e.g., every minute) or continuously reported by the agent to a central network monitor, such as network monitoring system 100 of FIG. 1. The method 600 can then proceed to 612, where the received data is used to calculate a transmission success rate for each node along the determined end-to-end path. The transmission success rate indicates a probability that a packet will be transmitted by the corresponding node in a predetermined time interval. The calculation of the transmission success rate can be based on output metrics of each network device interface or both input and output metrics of each network device interface, for example, as described above with respect to FIG. 2. When interfaces are aggregated into containers, the calculation of the transmission success rate can be based on an average of transmission success or loss rate across the interfaces of the container or by treating the container as a single interface, for example, as described above with respect to FIG. 5A.

The method 600 can then proceed to 614, where the transmission success rate for each node along the end-to-end path is combined to form an end-to-end transmission success rate. For example, the end-to-end transmission success rate may be determined as the product of individual transmission success rates at each node, or at each container when interfaces are aggregated into containers. The method 600 then proceeds to 616, where a probability of packet loss along the end-to-end path is calculated based on the end-to-end transmission success rate. For example, the probability of packet loss may be given by the complement to the end-to-end transmission success rate.

In some embodiments, the resulting solution (e.g., probability of packet loss) can be provided to an operator or provider of the network, for example, via an interactive user-interface or to a downstream system or service via an API. The method 600 can thus proceed to 618, where corrective action can be taken by the system, by the downstream system or service, or by the operator/provider of the network based on the probability of end-to-end packet loss. For example, the operator/provider can notify a particular customer of issues with data transmission from a particular source or to a particular destination, can take out of service network paths between particular source-destination pairs, and/or can identify particular network paths that require repair or further troubleshooting. In some embodiments, the downstream system or service can automatically compare the probability of end-to-end packet loss with a predetermined threshold for acceptable packet loss to determine network compliance and may provide a flag or alarm for end-to-end paths that exceed the threshold.

Although the description above focuses on the determination of a single path through the network between a source-destination pair, the process can be repeated for multiple source-destination pairs with respective end-to-end paths simultaneously or sequentially. Moreover, in some embodiments, multiple paths through the network between a particular source-destination pair may be available. Thus, in some embodiments, the network monitoring system can analyze all, most, or some of the available paths for the particular source-destination pair.

Figure 7:
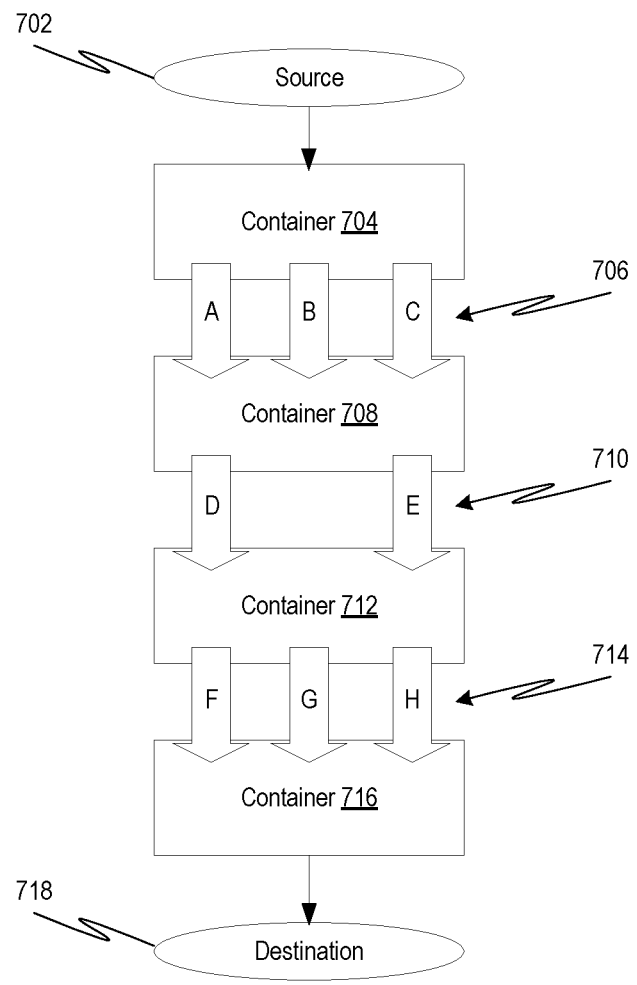
FIG. 7 is a simplified schematic diagram illustrating aspects of an alternative method for estimating end-to-end packet loss.

FIG. 7 illustrates certain aspects for estimating a probability of end-to-end packet loss for multiple potential paths between a source-destination pair, for example, by considering multiple interface combinations within containers along the container path. In the illustrated embodiments of FIG. 7, packets from source 702 that are sent to destination 718 have multiple path options by virtue of the multiple interface connections between neighboring containers. Container 704 is connected to container 708 by three interfaces 706 (e.g., A-C). Container 708 is connected to container 712 by two interfaces 710 (e.g., D-E). Container 712 is connected to container 716 by three interfaces 714 (e.g., F-H). Thus, there are eighteen different interface permutations that are available for transmission between source 702 and destination 718, e.g., ADF, ADG, ADH, AEF, AEG, AEH, BDF, BDG, BDH, BEF, BEG, BEH, CDF, CDG, CDH, CEF, CEG, and CEH. For each of the available paths based on the different interface permutations, an estimate of the probability of end-to-end packet loss can be calculated, for example, as described above with respect to FIG. 6.

The probability of packet loss for each path can then be compared to the predetermined threshold for acceptable packet loss rate. The percentage of available paths that comply with the threshold may be returned as a measure of network compliance or as a measure of potential packet loss. For example, if only one of the eighteen paths between source 702 and destination 718 is estimated to have an end-to-end path loss that exceeds the predetermined threshold (e.g., 0.1%), then the system may indicate that the 94.4% of available end-to-end paths are compliant and/or that an estimated 5.6% of flows between the source and destination may experience non-compliant loss of 0.1% or more. Alternatively or additionally, the probability of packet loss for each path can be provided to an operator or provider of the network, for example, via an interactive user-interface or to a downstream system or service via an API.

In some embodiments, the number of interface combinations may prove to be unwieldy, for example, when the number of container hops along the path grows (e.g., on the order of tens) and/or the number of interfaces per container grows (e.g., on the order of hundreds or thousands). To make the computation feasible, interfaces with similar loss profiles (e.g., within a predetermined percentage of each other) can be grouped together, thereby reducing the number of combinations albeit at the expense of some precision loss. For example, if interfaces F and H in FIG. 7 have similar loss profiles, those interfaces may be combined into a single interface, thereby collapsing the number of possible interface permutation by a third to twelve, e.g., ADF/H, ADG, AEF/H, AEG, BDF/H, BDG, BEF/H, BEG, CDF/H, CDG, CEF/H, and CEG.

Figure 8:
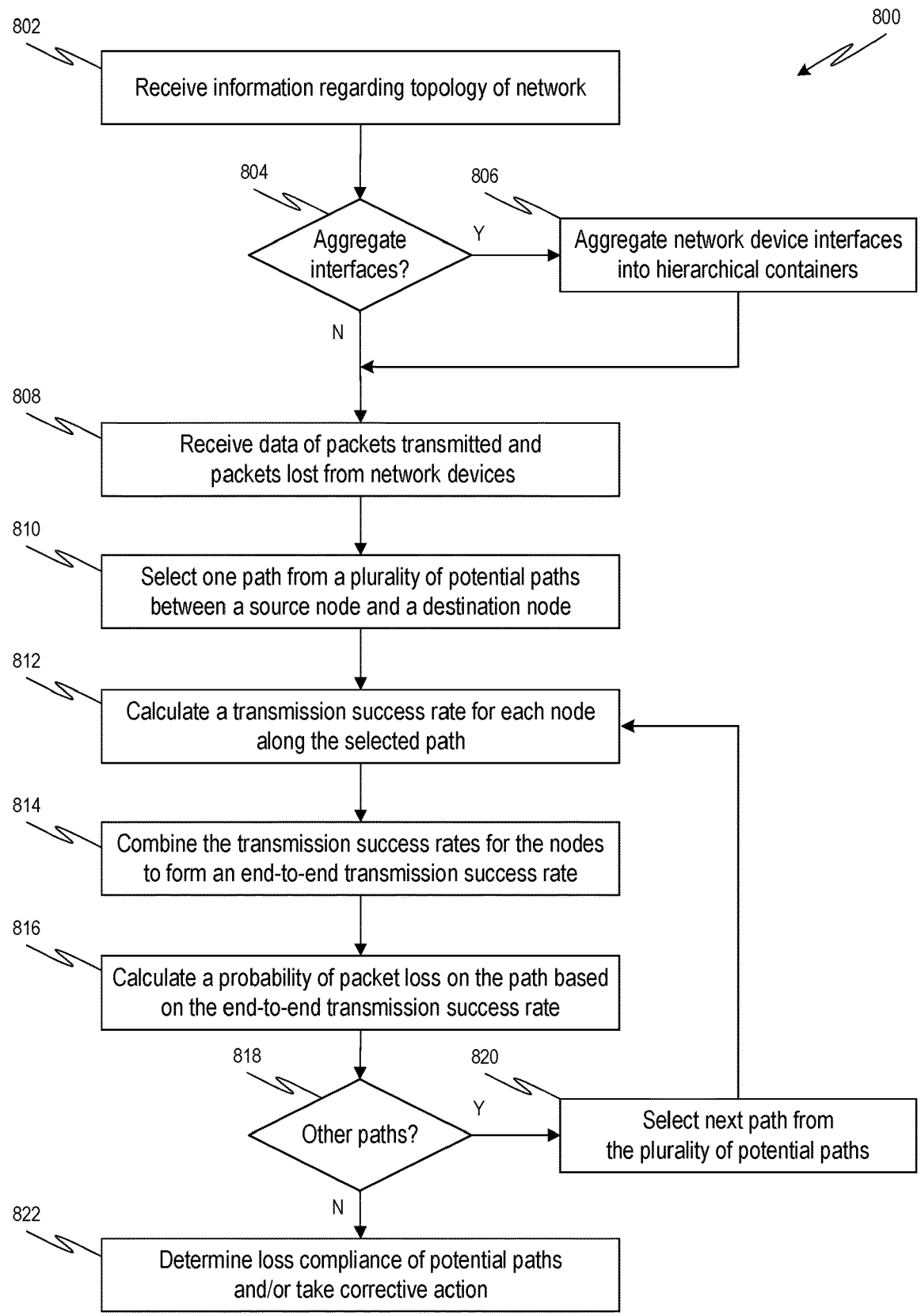
FIG. 8 is a process flow diagram of another exemplary method for estimating end-to-end network packet loss.

FIG. 8 depicts an exemplary method 800 for estimating packet loss for multiple potential end-to-end paths through a network. The method 800 can initiate at 802, where information regarding topology of the network can be received, for example, by the network monitoring system of FIG. 1. The information can include details of the network topology (e.g., the location of network devices and physical connections between network devices) and routing logic (e.g., routing or forwarding rules of the network, such as a routing table or forwarding table of each network device). The method 800 can proceed to 804, where it is determined if aggregation of network device interfaces is desired. If aggregation is desired at 804, for example, to reduce the amount of processing required, the method 800 proceeds to 806, where network device interfaces are hierarchically aggregated into respective containers based on neighbor information for each interface. For example, the aggregation of interfaces may be as described above with respect to FIGS. 5A-5C.

Once aggregation 806 is complete, or if aggregation is not desired at 804, the method 800 can proceed to 808, where data regarding packet transmission and loss at each network device (or containers, when interfaces are aggregated into containers) is received. The packet transmission and loss data can be collected by an agent, for example, agent 112 of FIG. 1 or agent 312 of FIG. 3. The collected data may be periodically (e.g., every minute) or continuously reported by the agent to a central network monitor, such as network monitoring system 100 of FIG. 1. The method 800 can proceed to 810, where a potential path from a source to a destination is selected from a plurality of available paths between the source-destination pair. For example, each available end-to-end path can be determined by network path module, such as network path module 104 of FIG. 1. Each available end-to-end path can have a unique combination of interfaces that would transmit a packet from the source through the network to the destination. The available end-to-end paths can be determined using the topology information of the network and/or the hierarchical aggregation graph of containers, for example, as described above with respect to FIG. 7. The method 800 can proceed to 812, where the received data is used to calculate a transmission success rate for each interface along the selected end-to-end path. The calculation of the transmission success rate can be based on output metrics of each network device interface or both input and output metrics of each network device interface, for example, as described above with respect to FIG. 2.

The method 800 can then proceed to 814, where the transmission success rate for each interface along the selected end-to-end path is combined to form an end-to-end transmission success rate. For example, the end-to-end transmission success rate may be determined as the product of individual transmission success rates at each interface. The method 800 then proceeds to 816, where the probability of packet loss along the selected end-to-end path is calculated based on the end-to-end transmission success rate. For example, the probability of packet loss may be given by the complement to the end-to-end transmission success rate. The method 800 then proceeds to 818, where it is determined if other available end-to-end paths should be analyzed. If available end-to-end paths remain, the method 800 can proceed 820, where the next available end-to-end path is selected, and 812-818 are repeated until all available end-to-end paths have been analyzed. Alternatively or additionally, the determination at 818 may take into account interfaces with similar loss profiles. As discussed above, in some embodiments, interfaces with similar loss profiles can be grouped together for processing efficiency, thereby reducing the number of available end-to-end paths that may be selected at 820.

If no additional end-to-end paths are to be analyzed at 818, the method 800 can proceed to 822, where the compliance of available paths can be determined. For example, the probability of packet loss for each path can be compared to a predetermined threshold for acceptable packet loss rate. The percentage of available paths that comply with the threshold may be returned as a measure of network compliance. As an alternative or in addition to the determination of compliance, the probability of packet loss for each path can be provided to an operator or provider of the network, for example, via an interactive user-interface or to a downstream system or service via an API. Based on the probability of packet loss for each path, corrective action can be taken by the system, by the downstream system or service, or by the operator/provider of the network. For example, the operator/provider can notify a particular customer of potential issues with data transmission from a particular source or to a particular destination, can take out of service network paths between particular source-destination pairs, and/or can identify particular network paths that require repair or further troubleshooting.

Figure 9:
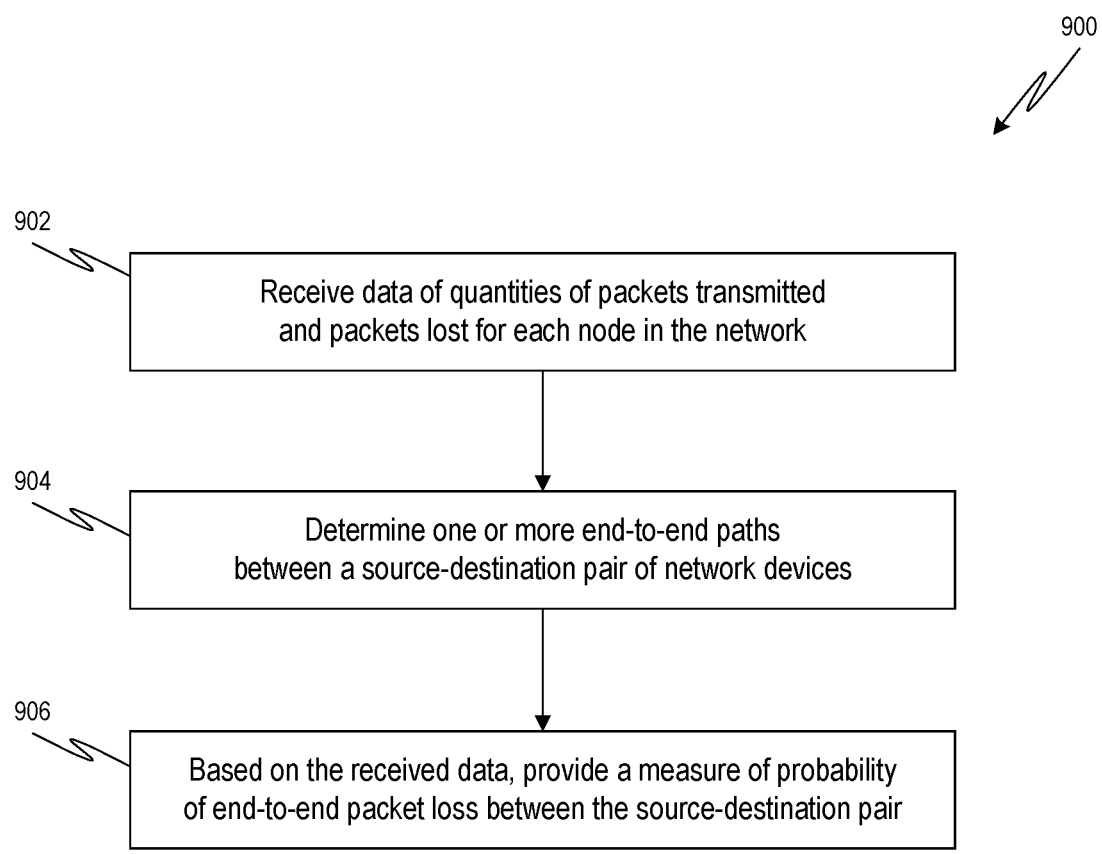
FIG. 9 is a process flow diagram of another exemplary method for estimating end-to-end network packet loss.

FIG. 9 depicts an exemplary method 900 for estimating end-to-end network packet loss. The method 900 can initiate at 902, where data of quantities of packets transmitted and packets lost (e.g., dropped or otherwise not transmitted due to an error) are received for each node (e.g., network device interface or aggregation of interfaces into a container) in the network. The data regarding quantities of packets transmitted and lost can be collected by an agent, for example, agent 112 of FIG. 1 or agent 312 of FIG. 3. The collected data may be periodically (e.g., every minute) or continuously reported by the agent to a central network monitor, such as network monitoring system 100 of FIG. 1.

The method 900 can then proceed to 904, where one or more end-to-end paths between a source-destination pair of network devices is determined. In some embodiments, a single end-to-end path can be determined for each source-destination pair in a network, for example, in a manner similar to that described above for 608 in FIG. 6. In other embodiments, multiple potential end-to-end paths can be determined for each source-destination pair in the network, for example, in a manner similar to that described above for FIGS. 7-8.

The method 900 can then proceed to 906, where a measure of a probability of end-to-end packet loss for traffic between the source-destination pair is determined. In some embodiments, the determined measure can be an estimate of the probability of packet loss for the determined end-to-end path, for example, in a manner similar to that described above for 614-618 in FIG. 6. In other embodiments, the determined measure can be a percentage of available end-to-end paths between a particular source-destination pair that have an estimated probabilities of packet loss that comply with a predetermined threshold for acceptable loss, or a percentage of available end-to-end paths that have estimated probabilities of packet loss that fail to comply with the predetermined threshold, for example, in a manner similar to that described above for FIGS. 7-8.

Figure 10:
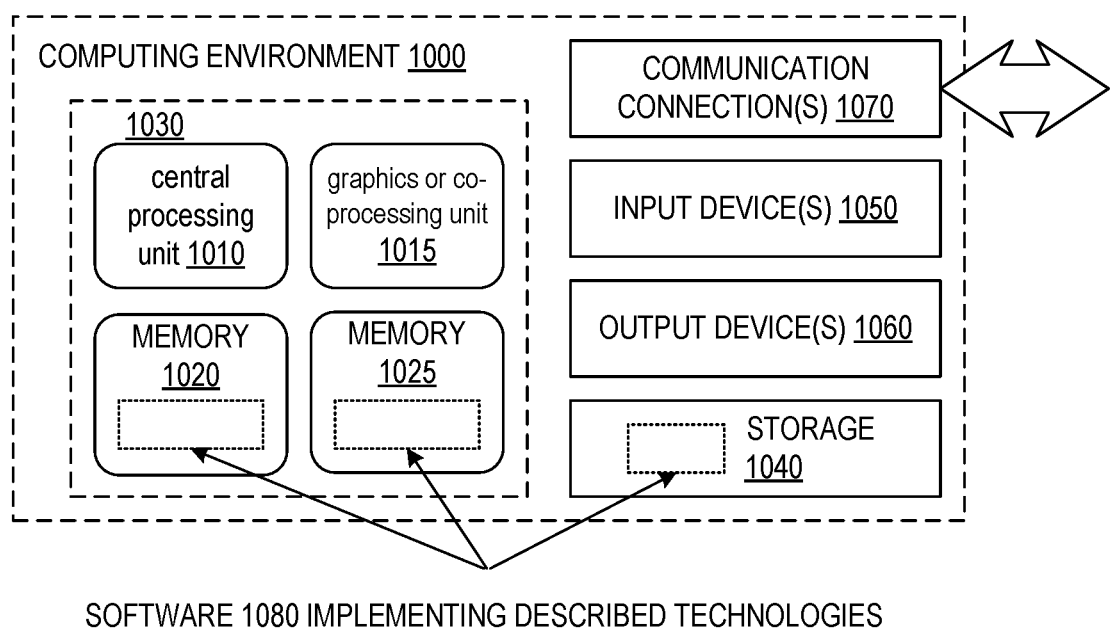
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 is any of a variety of computing devices (e.g., desktop computer, laptop computer, server computer, tablet computer, etc.).

The computing environment 1000 includes one or more processing units 1010, 1015 and memory 1020, 1025. In FIG. 10, this basic configuration 1030 is included within a dashed line. The processing units 1010, 1015 execute computer-executable instructions. Each processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of monitoring a network having a plurality of nodes, each node comprising at least one interface connecting network devices in the network, the method comprising:
   determining an end-to-end path for transmission of packets through the network from a source to a destination;
   receiving data of packets transmitted and packets lost for each of the plurality of nodes in the network, wherein each node comprises a container of multiple interfaces, and prior to the determining the end-to-end path, hierarchically aggregating interfaces into respective containers based on neighbor information for each of the multiple interfaces;
   based on the received data, calculating a transmission success rate for each node along the determined end-to-end path, the transmission success rate indicating a probability that a packet will be transmitted by the corresponding node in a predetermined time interval;
   combining the transmission success rates for the nodes along the determined end-to-end path to form an end-to-end transmission success rate; and
   calculating a probability of packet loss for the determined end-to-end path as the complement to the end-to-end transmission success rate.

2. The method of claim 1, further comprising calculating the transmission success rate for each container by:
   adding together quantities of packets transmitted and quantities of packets lost by all of the interfaces of the container to produce a total number of packets handled by the container;
   adding together the quantities of packets transmitted by all of the interfaces of the container to produce a total number of packets transmitted by the container; and
   calculating the transmission success rate for the container as a ratio of the total number of packets transmitted to the total number of packets handled.

3. The method of claim 1, further comprising calculating the transmission success rate for each container by:
   for each interface of the container, calculating an interface transmission success rate as a ratio of total quantity of packets transmitted by the interface to a total quantity of packets handled by the interface; and
   calculating the transmission success rate for the container as an average of the interface transmission success rates for the interfaces of the container.

4. The method of claim 1, wherein the determining the end-to-end path comprises determining the end-to-end path using topology information of the network and forwarding logic of the network devices.

5. The method of claim 1, wherein the determining the end-to-end path comprises simulating routing behavior of the network.

6. The method of claim 1, wherein the determining the end-to-end path comprises sending a probe packet through the network from the source to the destination and monitoring a path through the network taken by the probe packet.

7. One or more non-transitory computer-readable storage media collectively storing computer-executable instructions that, when executed by one or more computer systems, configure the one or more computer systems to collectively perform operations comprising:
   receiving data of quantities of packets transmitted and packets lost for each node in a network, the network comprising a plurality of nodes, each node comprising at least one interface connecting network devices in the network, wherein each node comprises a container of multiple interfaces;
   hierarchically aggregating interfaces into respective containers based on neighbor information for each interface;

determining one or more end-to-end paths between a source-destination pair of network devices in the network using the hierarchically aggregated interfaces; and based on the received data, providing a measure of a probability of end-to-end packet loss between the source-destination pair.

8. The one or more non-transitory computer-readable storage media of claim 7, wherein the media collectively store additional computer-executable instructions that, when executed by the one or more computer systems, configure the one or more computer systems to collectively perform further operations comprising:

for each container along the determined end-to-end path, adding together quantities of packets transmitted and quantities of packets lost by all of the interfaces of the container to produce a total number of packets handled by the container;

for each container along the determined end-to-end path, adding together the quantities of packets transmitted by all of the interfaces of the container to produce a total number of packets transmitted by the container;

for each container along the determined end-to-end path, calculating a transmission success rate for the container as a ratio of the total number of packets transmitted to the total number of packets handled;

combining the transmission success rates for the containers along the determined end-to-end path to form an end-to-end transmission success rate; and calculating the probability of end-to-end packet loss for traffic along the determined end-to-end path based on the end-to-end transmission success rate.

9. The one or more non-transitory computer-readable storage media of claim 7, wherein the media collectively store additional computer-executable instructions that, when executed by the one or more computer systems, configure the one or more computer systems to collectively perform further operations comprising:

for each container along the determined end-to-end path, calculating an interface transmission success rate for each interface of the container as a ratio of a total quantity of packets transmitted by the interface to a total quantity of packets handled by the interface;

for each container along the determined end-to-end path, calculating a transmission success rate for the container as an average of the interface transmission success rates for the interfaces of the container;

combining the transmission success rates for the containers along the determined end-to-end path to form an end-to-end transmission success rate; and calculating the probability of end-to-end packet loss for traffic along the determined end-to-end path based on the end-to-end transmission success rate.

10. The one or more non-transitory computer-readable storage media of claim 7, wherein the media collectively store additional computer-executable instructions that, when executed by the one or more computer systems, configure the one or more computer systems to collectively perform further operations comprising:

determining multiple potential end-to-end paths between the source-destination pair of network devices, each determined end-to-end path employing a different combination of interfaces between containers; and for each potential end-to-end path, calculating a probability of packet loss based on the data of packets transmitted and packets lost for the containers along the end-to-end path.

11. The one or more non-transitory computer-readable storage media of claim 10, wherein the media collectively store additional computer-executable instructions that, when executed by the one or more computer systems, configure the one or more computer systems to collectively perform further operations comprising:

determining a percentage of potential end-to-end paths whose probabilities of packet loss are less than a predetermined threshold value.

12. The one or more non-transitory computer-readable storage media of claim 7, wherein the media collectively store additional computer-executable instructions that, when executed by the one or more computer systems, configure the one or more computer systems to collectively perform further operations comprising:

deriving the end-to-end path between the source-destination pair using topology information of the network and forwarding logic of the network devices.

13. The one or more non-transitory computer-readable storage media of claim 7, wherein the media collectively store additional computer-executable instructions that, when executed by the one or more computer systems, configure the one or more computer systems to collectively perform further operations comprising:

simulating routing behavior of the network to determine the one or more end-to-end paths between the source-destination pair.

14. The one or more non-transitory computer-readable storage media of claim 7, wherein the media collectively store additional computer-executable instructions that, when executed by the one or more computer systems, configure the one or more computer systems to collectively perform further operations comprising:

sending a probe packet through the network from the source to the destination, and monitoring a path through the network taken by the probe packet to determine the one or more end-to-end paths between the source-destination pair.

15. A system comprising:

a network monitoring unit executing on a processor using computer-executable instructions configured to:

receive data of quantities of packets transmitted and packets lost from respective nodes of a network, each node comprising at least one interface connecting network devices in the network;

determine one or more end-to-end paths between a source-destination pair of network devices in the network; and provide a measure of a probability of end-to-end packet loss for traffic between the source-destination pair;

wherein the network monitoring unit is further configured to hierarchically aggregate interfaces into respective containers based on neighbor information for each interface, such that each node comprises a container of multiple interfaces.

16. The system of claim 15, further comprising:

the network, which comprises a plurality of the network devices, each network device including an agent that monitors a number of packets transmitted and a number of packets lost for the respective network device and periodically transmits the data to the network monitoring unit, wherein each network device is a network switch or router.

17. The system of claim 15, wherein the path loss module is configured to provide the measure of the probability of end-to-end packet loss by:

calculating a transmission success rate for each node along the end-to-end path determined by the network monitoring unit based on the data received by the network monitoring unit, the transmission success rate indicating a probability that a packet will be transmitted by the corresponding node in a predetermined time interval;

combining the transmission success rates for the nodes along the determined end-to-end path to form an end-to-end transmission success rate; and calculating the probability of packet loss for the determined end-to-end path as the complement to the end-to-end transmission success rate.

* * * * *